US 9,813,968 B1

United States Patent
Dreiling et al.

(10) Patent No.: US 9,813,968 B1
(45) Date of Patent: Nov. 7, 2017

(54) MANAGEMENT OF CHANNEL STATUS INFORMATION FOR LTE REDIRECTS

(71) Applicant: Sprint Communications Company L.P., Overland Park, KS (US)

(72) Inventors: Ryan P. Dreiling, Shawnee, KS (US); Curtis Alan Bray, Overland Park, KS (US); Sreekar Marupaduga, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 55 days.

(21) Appl. No.: 14/931,411

(22) Filed: Nov. 3, 2015

(51) Int. Cl.
*H04W 36/22* (2009.01)
*H04W 36/30* (2009.01)
*H04W 74/00* (2009.01)
*H04W 8/02* (2009.01)
*H04W 68/04* (2009.01)

(52) U.S. Cl.
CPC ............. *H04W 36/30* (2013.01); *H04W 8/02* (2013.01); *H04W 68/04* (2013.01); *H04W 74/002* (2013.01)

(58) Field of Classification Search
CPC . H04W 88/06; H04W 36/0022; H04W 36/14; H04W 48/18
USPC ................................................. 370/331, 332
See application file for complete search history.

(56) References Cited

U.S. PATENT DOCUMENTS

| | | | |
|---|---|---|---|
| 8,694,003 B2 | 4/2014 | Huang et al. | |
| 2011/0250925 A1 | 10/2011 | Han | |
| 2013/0100795 A1 | 4/2013 | Zhao et al. | |
| 2013/0243079 A1* | 9/2013 | Harris | H04L 65/605 |
| | | | 375/240.02 |
| 2014/0376363 A1 | 12/2014 | Park et al. | |
| 2014/0378136 A1 | 12/2014 | Park et al. | |
| 2015/0139195 A1* | 5/2015 | Xiao | H04W 36/22 |
| | | | 370/332 |
| 2016/0353330 A1* | 12/2016 | Naik | H04W 36/0022 |

* cited by examiner

*Primary Examiner* — Charles C Jiang
*Assistant Examiner* — Will Lin (57) ABSTRACT

Systems, methods, and software described herein provide enhancements for the redirection of communication requests from a Long Term Evolution (LTE) network to a secondary wireless communication network. In one implementation, a method of operating a mobility management entity (MME) includes receiving, over a LTE network, channel status information for channels in a secondary wireless communication network from wireless communication devices. The method further provides receiving a communication request over the LTE network from a wireless communication device, and in response to the communication request, identifying a channel in the secondary wireless communication network to support the communication request based on the channel status information. The method also includes transferring a notification to the wireless communication device to indicate the identified channel.

18 Claims, 8 Drawing Sheets

| CHANNELS 610 | STATUS DATA 620 | STATUS DATA 621 | STATUS DATA 622 |
|---|---|---|---|
| CHANNEL | VALUE | VALUE | VALUE |
| CHANNEL | VALUE | VALUE | VALUE |
| CHANNEL | VALUE | VALUE | VALUE |
| CHANNEL | VALUE | VALUE | VALUE |
| CHANNEL | VALUE | VALUE | VALUE |
| CHANNEL | VALUE | VALUE | VALUE |
| CHANNEL | VALUE | | VALUE |

CHANNEL STATUS DATA STRUCTURE 600

MANAGEMENT OF CHANNEL STATUS INFORMATION FOR LTE REDIRECTS

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some implementations, Long Term Evolution (LTE) wireless networks may prefer to offload or redirect particular communications to alternative communication networks, such as code division multiple access (CDMA) networks or some other third generation wireless signaling network. To accomplish this task, a mobility management entity (MME) may receive a communication request over the LTE network, identify a channel in the alternative communication network, and redirect the communication to the identified channel. However, although capable of redirecting a device to a channel in the alternative network, the MME is incapable of determining whether the redirect to the alternative network was successful and whether the channel was capable of completing the desired communication.

Overview

The technology disclosed herein enhances the redirection of communication requests from a Long Term Evolution (LTE) network to a secondary wireless communication network. In one implementation, a method of operating a mobility management entity to redirect a communication request from a wireless communication device based on channel status information includes receiving, over a LTE network, the channel status information for one or more channels in a secondary wireless communication network from the one or more wireless communication devices. The method further provides receiving the communication request over the LTE network from the wireless communication device, and in response to the communication request, identifying a channel in the secondary wireless communication network to support the communication request based on the channel status information. The method also includes transferring a notification to the wireless communication device to indicate the identified channel.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
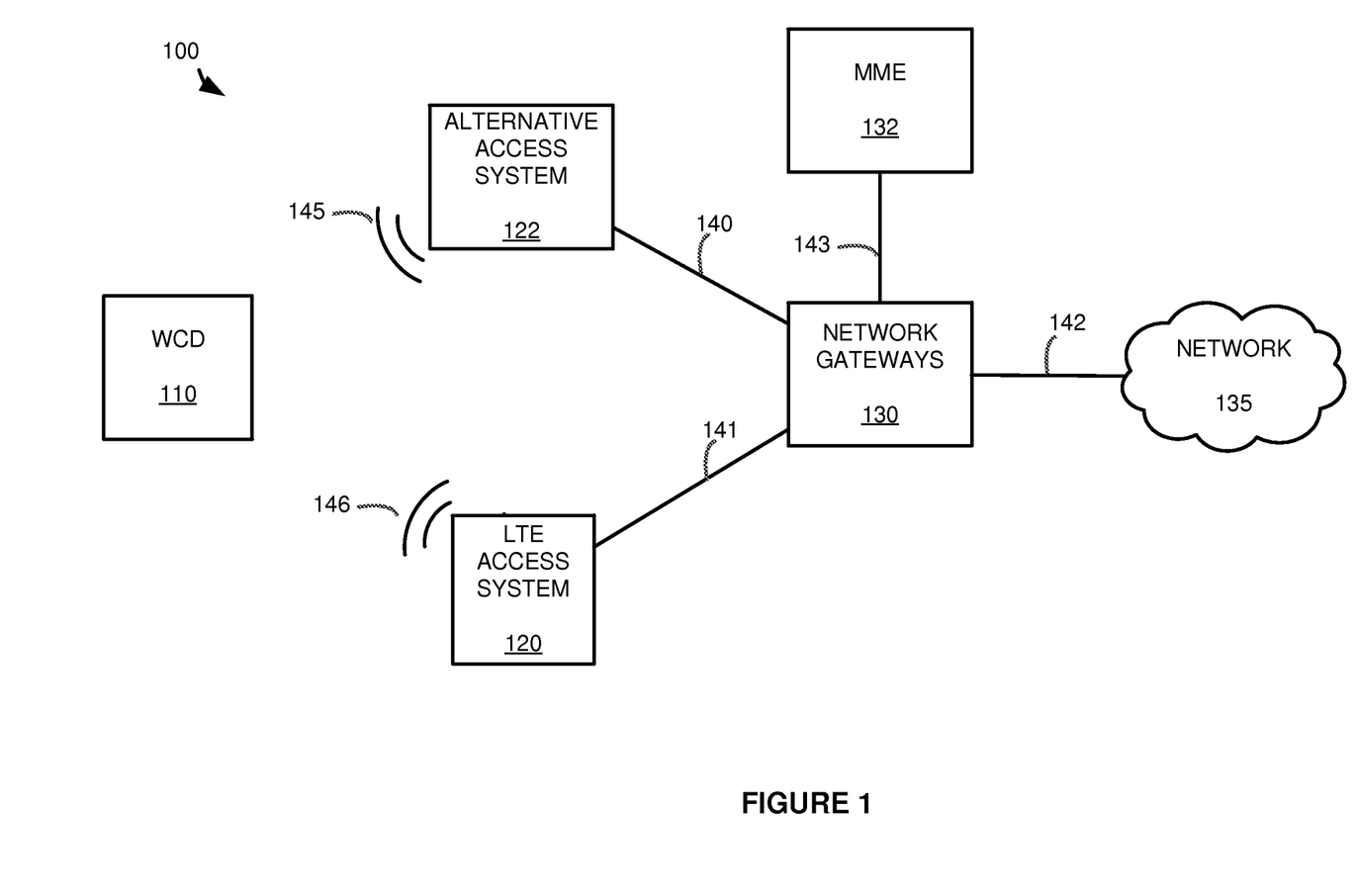
FIG. 1 illustrates a communication system to redirect communication requests over a Long Term Evolution network.

FIG. 1 illustrates a communication system 100 to redirect communication requests over a Long Term Evolution network. Communication system 100 includes wireless communication device (WCD) 110, Long Term Evolution (LTE) access system 120, alternative access system 122, network gateways 130, mobility management entity 132, and network 135. LTE access system 120 communicates with WCD 110 using LTE signaling 145. Alternative access system 122 communicates with WCD 110 using an alternative signaling, such as code division multiple access (CDMA) or some other third generation wireless signaling. LTE access system 120 communicates with network gateways 130 via communication link 141, while alternative access system 122 communicates with network gateways 130 via communication link 140. Network gateways 130 further communicate with MME 132 via communication link 143 and network 135 via communication link 142.

Network gateways 130 may comprise serving gateways (SGWs), packet data network gateways (PGWs), or some other gateway of a wireless network that provides a communication path between the wireless access nodes and the end network represented by network 135. Network 135 may comprise the internet, may comprise an internet protocol multimedia subsystem (IMS), or may comprise some other similar packet network.

In operation, WCD 110 may attach and request communication services over LTE access system 120, which forwards the request over at least one gateway in network gateways 130 to MME 132. This communication request may comprise a voice communication request, a data request for a particular application, a request for a video communication, a request for a video stream, or any other similar communication request. In response to the request, MME 132 may redirect the communication request to an alternative network based on the type of communication requested. For example, if the communication request comprised a voice request, a rule set for MME 132 may define that all voice communications take place over alternative access system 122. Accordingly, MME 132 may determine a channel in alternative access system 122 and notify WCD 110 of the appropriate channel for the communication.

In the present implementation, to determine the channel for alternative access system 122, MME 132 may receive and maintain channel status information for the various channels available on alternative access system 122. This channel status information may be received from WCD 110, as well as any other wireless device communicating over alternative access system 122. The information may include indications of whether a communication could be completed over the channels, signal to noise information about the channels, capacity information about the channels, location information for devices using the channels, or any other similar channel status information, including combinations thereof.

Figure 2:
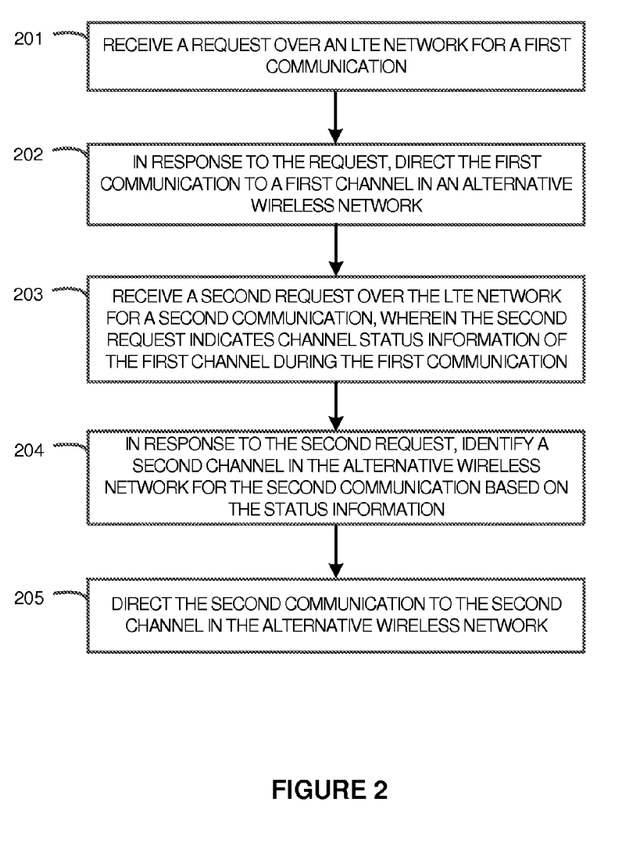
FIG. 2 illustrates a method of operating a mobility management entity to redirect communication requests from wireless communication devices based on channel status information.

FIG. 2 illustrates a method of operating a mobility management entity to redirect communication requests from wireless communication devices based on channel status information. The operations of FIG. 2 are referenced parenthetically in the paragraphs that follow with references to the systems and elements of communication system 100 in FIG. 1.

As demonstrated in FIG. 2, a method of operating a MME includes receiving a request over an LTE network for a first communication (201). In response to the request, the MME directs the first communication to a first channel in an alternative wireless network (202). In reference to FIG. 1, while WCD 110 is attached to LTE access system 120, WCD 110 may transfer a communication request over LTE access system 120 and network gateways 130 to MME 132. In response to the request, MME 132 determines that the communication should be processed using alternative access system 122 for an alternative wireless network, and provides a channel associated with alternative access system 122 to WCD 110. WCD 110 may receive the defined channel from LTE access system 120, and initiate the communication using the channel provided by MME 132.

After the first channel is provided to the WCD over the LTE network and the communication is initiated by the wireless device, the method further provides receiving a second request over the LTE network for a second communication, wherein the second request indicates channel status information of the first channel during the first communication for the wireless communication device (203). The method further provides, in response to the second request, identifying a second channel in the alternative wireless network for the second communication based on the status information (204), and directing the second communication to the second channel in the alternative wireless network (205).

Again with reference to FIG. 1, after the communication is initiated by WCD 110, the communication may be incapable of being sustained using the first channel over alternative access system 122. Consequently, when the communication fails, WCD 110 may initiate a second request for a communication over LTE access system 120 and network gateways 130 to MME 132. Unlike the first communication request, WCD 110 may include channel status information for the first channel, including but not limited to, signal to noise information about the channels, capacity information about the channels, location information for devices using the channels, or any other similar channel status information. Based on the information, MME 132 may select an alternative channel over alternative access system 122 and provide the alternative channel to WCD 110 for the communication. Accordingly, using the example of the voice communication, if the voice communication could not be completed using the first channel on alternative access system 122, the alternative channel is provided that can potentially complete the voice communication. This prevents providing the same channel to WCD 110 for both communication requests, which would likely result in the communication being failed twice.

Although illustrated in the present example as being provided channel status information by a single WCD, it should be understood that the channel status information may be provided by multiple communication devices that request a communication over the LTE network. For example, after each of the devices are redirected and attempt a communication using a channel provided by MME 132, the devices may report back on the status of the particular channel. This reported information may include signal to noise information, information about whether the communication was successful over alternative access system 122, capacity information for the channel on alternative access system 122, or any other similar information, including combinations thereof. Once the information is provided by the other devices, the information for the devices may be used in selecting the channel that is provided to the WCD. In some implementations, the information that is provided by the other devices may be used over a particular period of time to suggest the channel for new communications. After the period expires, the status information may be dismissed because the information may no longer be an accurate reflection of the state of alternative access system 122.

Figure 3:
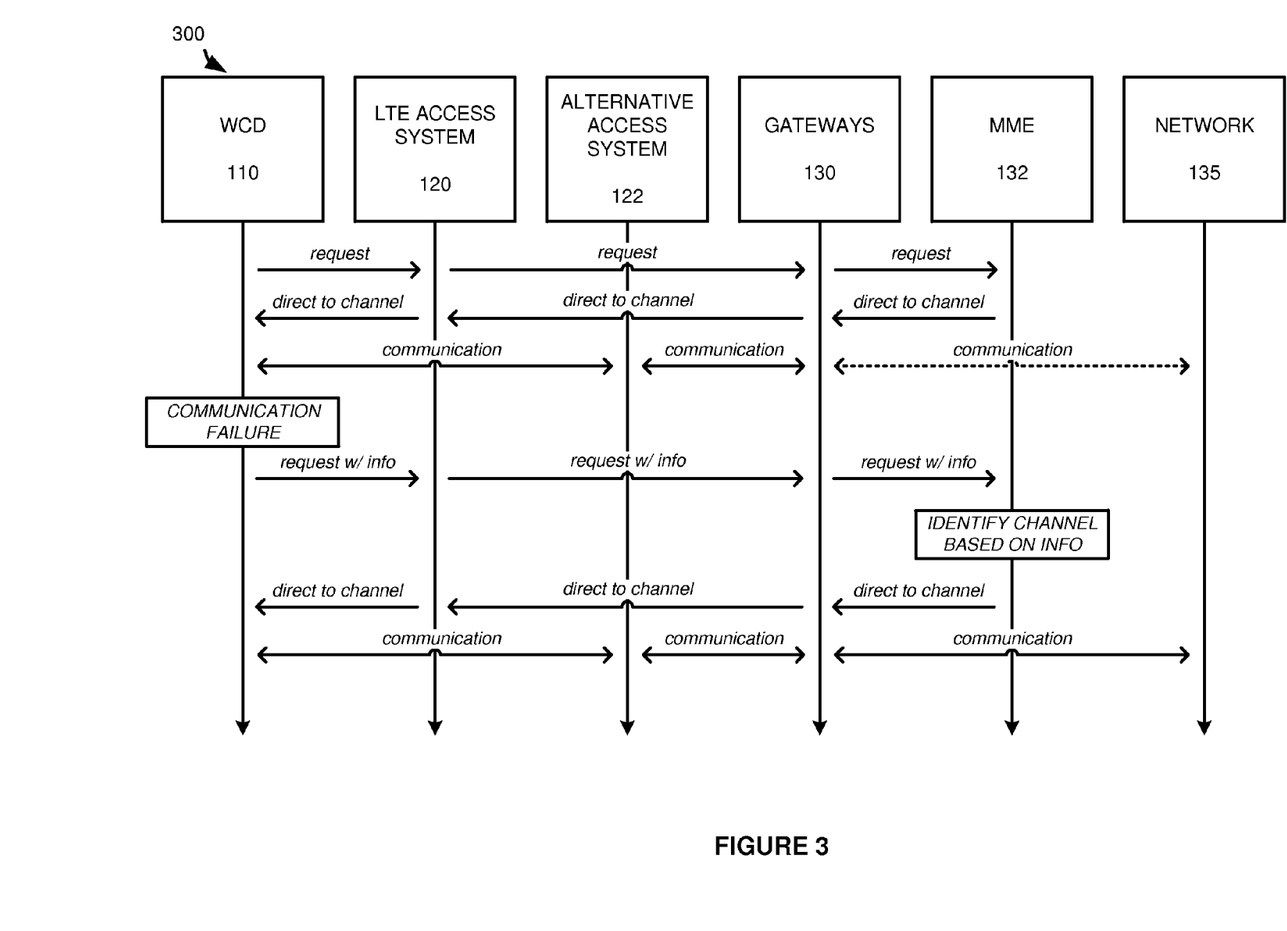
FIG. 3 illustrates a timing diagram to redirect communication requests from a wireless communication device based on channel status information.

FIG. 3 illustrates a timing diagram 300 to redirect communication requests from a wireless communication device based on channel status information. Timing diagram 300 includes WCD 110, LTE access system 120, alternative access system 122, gateways 130, MME 132, and network 135 from communication system 100 in FIG. 1.

Timing diagram 300 includes WCD 110 transmitting a communication request over LTE access system 120 and gateways 130 to MME 132. This communication request may comprise a voice communication request, a video communication request, or any other communication request for applications and processes on WCD 110. In response to the request, MME 132 identifies a channel for the communication from a plurality of possible channels in alternative access system 122, and provides the channel to WCD 110 to direct the communication. Once the channel is received by WCD 110, WCD 110 attempts to initiate the communication over alternative access system 122, gateways 130, and network 135.

During the communication attempt by WCD 110 the communication may fail, preventing the WCD from transmitting or receiving the required data. Once the failure occurs, WCD 110 may transfer a second request over LTE access system 120 and gateways 130 to MME 132 for the communication. Unlike the first request, once the device is attached to the LTE network after the communication failure, the second request may include channel status information for the channel that was used in the first communication attempt. This information may then be used by MME 132 to identify a second channel to support the desired communication for WCD 110.

Once the second channel is identified by MME 132, MME 132 communicates the second channel to WCD 110 using gateways 130 and LTE access system 120. The second channel may then be used by WCD 110 in the communication over alternative access system 122, gateways 130, and network 135. By providing the channel status information in the second request, WCD 110 may ensure that the same channel is not provided by MME 132 for the first communication attempt and the second communication attempt. For example, if a first channel was provided for a voice communication on WCD 110, but the voice communication failed before the desired conclusion to the communication, WCD 110 may transfer a second communication request indicating the failure using the first channel. In response to the second communication request, MME 132 may determine an alternative channel to support the request, and provide the channel to WCD 110 for the communication.

In some implementations, the operations of requesting and receiving a channel may be repeated as many times as necessary until the communication can be completed by WCD 110. For instance, if the second communication also failed for WCD 110, a third request may be transmitted to MME 132, wherein the third request also includes channel status information for the channel used in the second communication. Responsive to the request, MME 132 determines a third channel to support the communication and provides the third channel to WCD 110.

Although not illustrated in the present example, it should be understood that in some implementations in addition to providing the selected channel to WCD 110, MME 132 might also configure alternative access system 122 with the channel for WCD 110. In particular, MME 132 may notify alternative access system 122 that WCD 110 is requesting a communication, and may further provide the selected channel for WCD 110 to alternative access system 122.

Figure 4A:
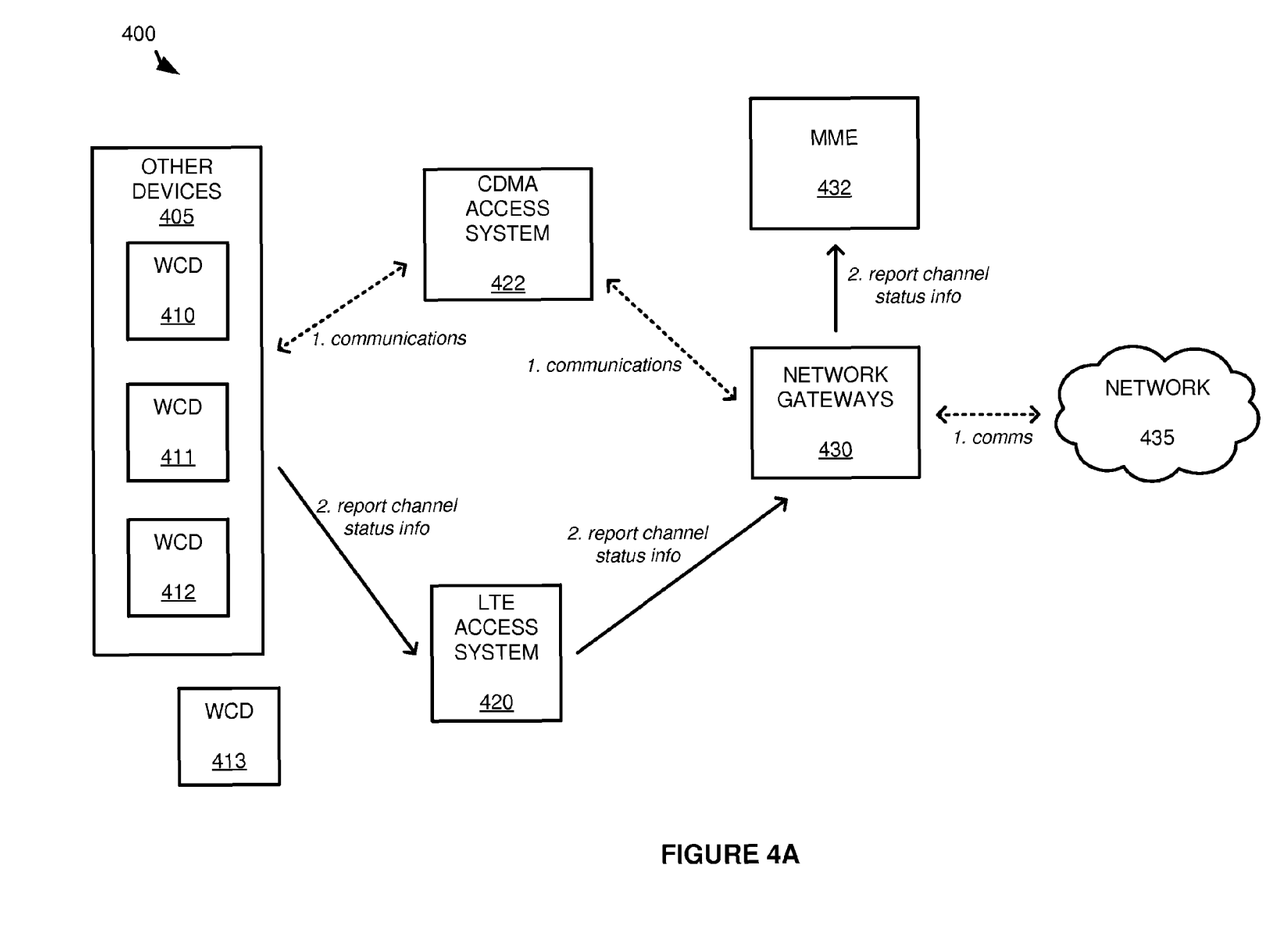
FIG. 4A illustrates an operational scenario of providing channel status information to a LTE network.

FIG. 4A illustrates an operational scenario 400 of providing channel status information to a LTE network. Operational scenario 400 includes other devices 405, WCD 413, CDMA access system 422, LTE access system 420, network gateways 430, MME 432, and network 435. Other devices 405 includes WCDs 410-412, which may each comprise a smartphone, tablet, laptop, gaming system, or some other similar wireless communication device including combinations thereof. FIG. 4A demonstrates providing channel status information from multiple WCDs to assist in determining a channel for another WCD.

In particular, operational scenario 400 includes attempting first communications for other devices 405 over CDMA access system 422 and network gateways 430 to network 435. These communication attempts over CDMA access system 422 are each provided with channels in the CDMA network for the communications. Once the communications are successfully completed, or failed in some examples, other devices 405 determine and report channel status information for the channel that was used in the communication. This channel status information may include indications of whether a communication could be completed over the channels, signal to noise information about the channels, capacity information about the channels, location information for devices using the channels, or any other similar channel status information, including combinations thereof. As illustrated in operational scenario 400, this information is provided to MME 432 over LTE access system 420 and network gateways 430, as other devices 405 are attached to LTE access system 420 following the communications.

Figure 4B:
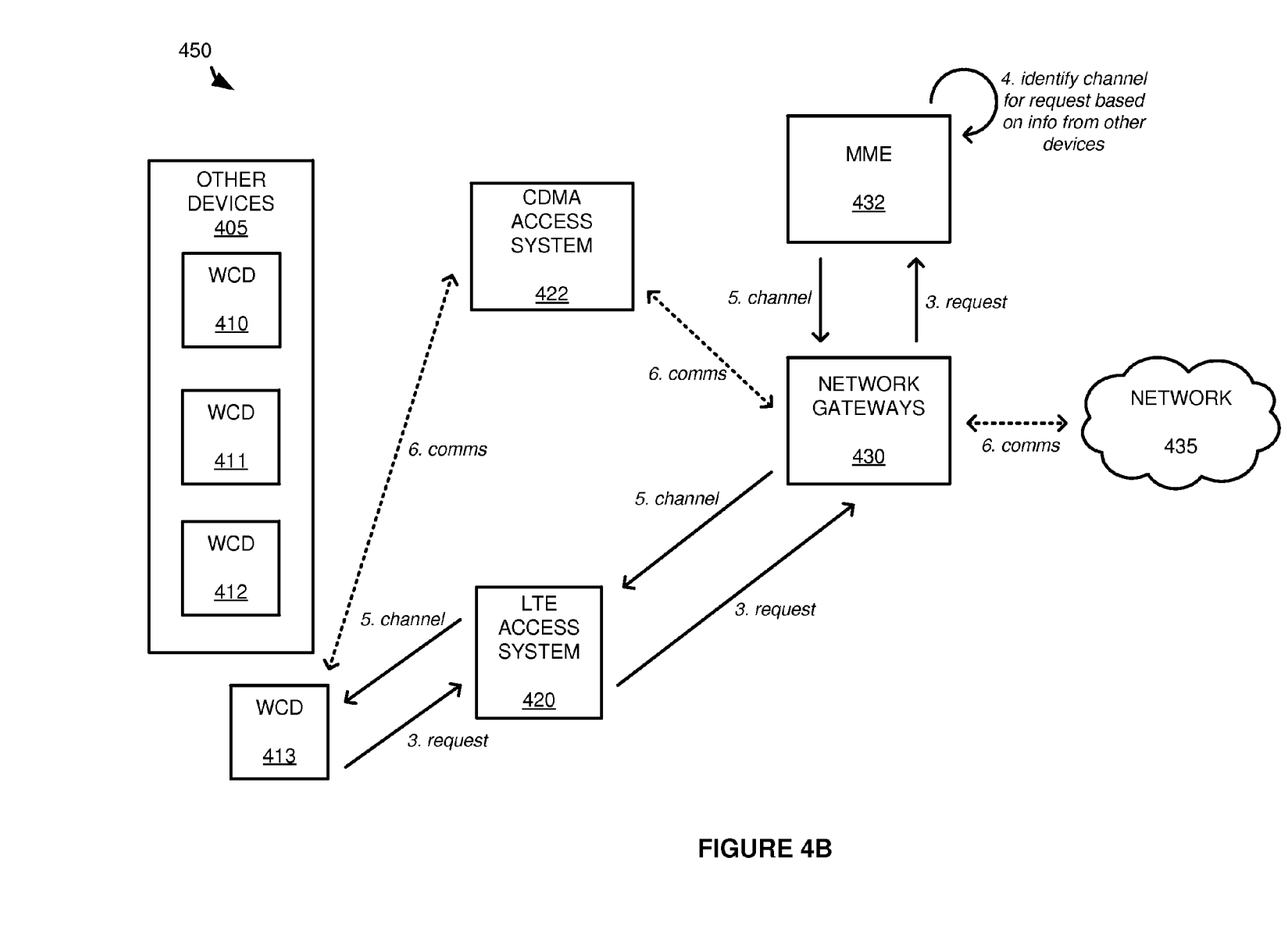
FIG. 4B illustrates an operational scenario of using channel status information to redirect a communication request from a wireless communication device.

Turning to FIG. 4B, FIG. 4B illustrates an operational scenario 450 of using channel status information to redirect a communication request from a wireless communication device. Operational scenario 450 is a continuation of the operations provided in operational scenario 400 of FIG. 4A. Operational scenario 450 includes the same systems and elements as operational scenario 400 from FIG. 4A.

As depicted in FIG. 4B, once MME 432 has received channel status reports from devices communicating via CDMA access system 422, WCD 413 may initiate a communication request over LTE access system 420 and network gateways 430 to MME 432. In response to the communication request, which may comprise a request for a voice communication, a video communication, a streaming request, or any other similar communication request, MME 432 determines that the communication should be redirected to CDMA access system 422. In some implementations, specific types of communications may be determined to be better suited on networks other than LTE access system 420. For example, voice communications may require less bandwidth, and consequently be direct to CDMA access system 422 to make more resources available on LTE access system 420.

Once it is determined that the communication should be redirected to CDMA access system 422, MME 432 determines a channel in the CDMA network to support the communication request. In the present example, to determine the channel for the communication, MME 432 may analyze the channel status information that was provided by other devices 405. Accordingly, channels that were indicated to be successful in completing a desired communication for other devices 405 may be selected for WCD 413 ahead of channels that were indicated to be unsuccessful in completing a desired communication for other devices 405. In some implementations, an algorithm executed by a processor for MME 432 may generate a score for each of the channels of the CDMA network. These scores may then be used in determining whether a channel will be provided to a new requesting wireless device. For example, criteria may be defined and compared to a channel score to determine if the channel may be provided to new communication requests.

In some examples, the information that is provided by other devices 405 may be used in determining future channel recommendations for a particular period of time. For example, channel status information may only be used in determining future channels for communications over a period of five minutes. Once the period expires, the channel status information will no longer be used in making the channel determinations.

After the channel is defined for WCD 413 in CDMA access system 422, MME 432 transfers the channel information over LTE access system 420 to WCD 413. In response to receiving the channel information, WCD 413 may initiate the communication over CDMA access system 422 and network gateways 430 using the channel provided by MME 432. Although not illustrated in the present implementation, in addition to providing the channel information to WCD 413, MME 432 may also notify CDMA access system 422 of the channel allocated to WCD 413. This information may be used by CDMA access system 422 to initiate the communication with WCD 413.

Figure 5:
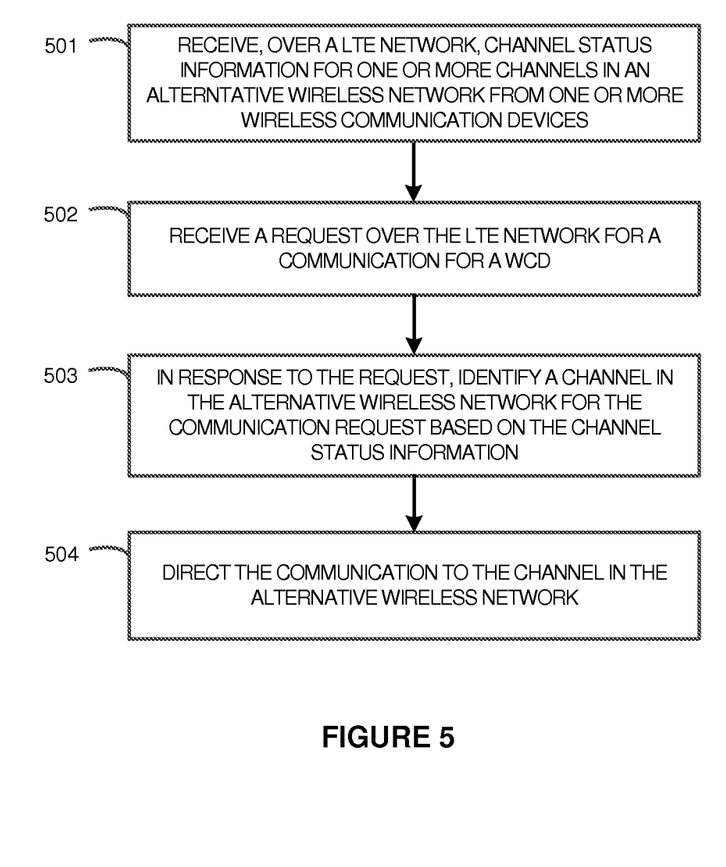
FIG. 5 illustrates a method of operating a mobility management entity to redirect a communication request from a wireless communication device based on channel status information.

FIG. 5 illustrates a method of operating a mobility management entity to redirect a communication request from a wireless communication device based on channel status information. The operations of FIG. 5 are referenced parenthetically in the paragraphs that follow with reference to systems illustrated in operational scenarios 400 and 450 from FIGS. 4A and 4B.

As illustrated in FIG. 5, the method of operating the MME includes receiving, over a LTE network, channel status information for one or more channels in an alternative wireless network from one or more wireless communication devices (501). In particular, WCDs may use an alternative network to the LTE network, such CDMA access system 422, for specific types of communications. Once the communications are completed, or failed in some examples, and devices reattach to the LTE network, the devices may transfer channel status information to the MME. The MME may then use the status information to identify channels within the alternative network for future communication requests.

Once the status information is obtained by the MME, the method further includes receiving a request over the LTE network for a communication on the WCD (502). In response to the request, the method identifies a channel in the alternative wireless network for the communication request based on the channel status information received from the one or more wireless communication devices (503). After the channel is determined for the communication, the MME directs the communication for the WCD to the channel in the alternative wireless network (504).

Returning to the examples in FIGS. 4A and 4B, WCD 413 transfers a request to MME 432. In response to receiving the request, MME 432 identifies a channel from a plurality of channels in CDMA access system 422 based on the status information provided from other devices 405. Once the channel is selected, the channel is transferred or provided to WCD 413, permitting WCD 413 to initiate the communication using the identified channel.

Although illustrated in the example of FIGS. 4A and 4B as receiving status information from multiple other wireless devices, it should be understood that WCD 413 may supply the channel status information to MME 432 in addition to or in place of other devices 405. For example, similar to the operations described in FIGS. 1-3, WCD 413 may initiate a first communication using a first channel in the alternative network, wherein the first communication fails for the WCD. Once the communication fails, WCD 413 may transfer a second request with channel status information for the channel used in the first communication. In response to the second request, the MME may determine a second channel that is different from the first channel based on the status information provided by WCD 413. Further, in some implementations, status information provided by WCD 413 may also be used to supplement the information provided by other devices 405.

Figure 6:
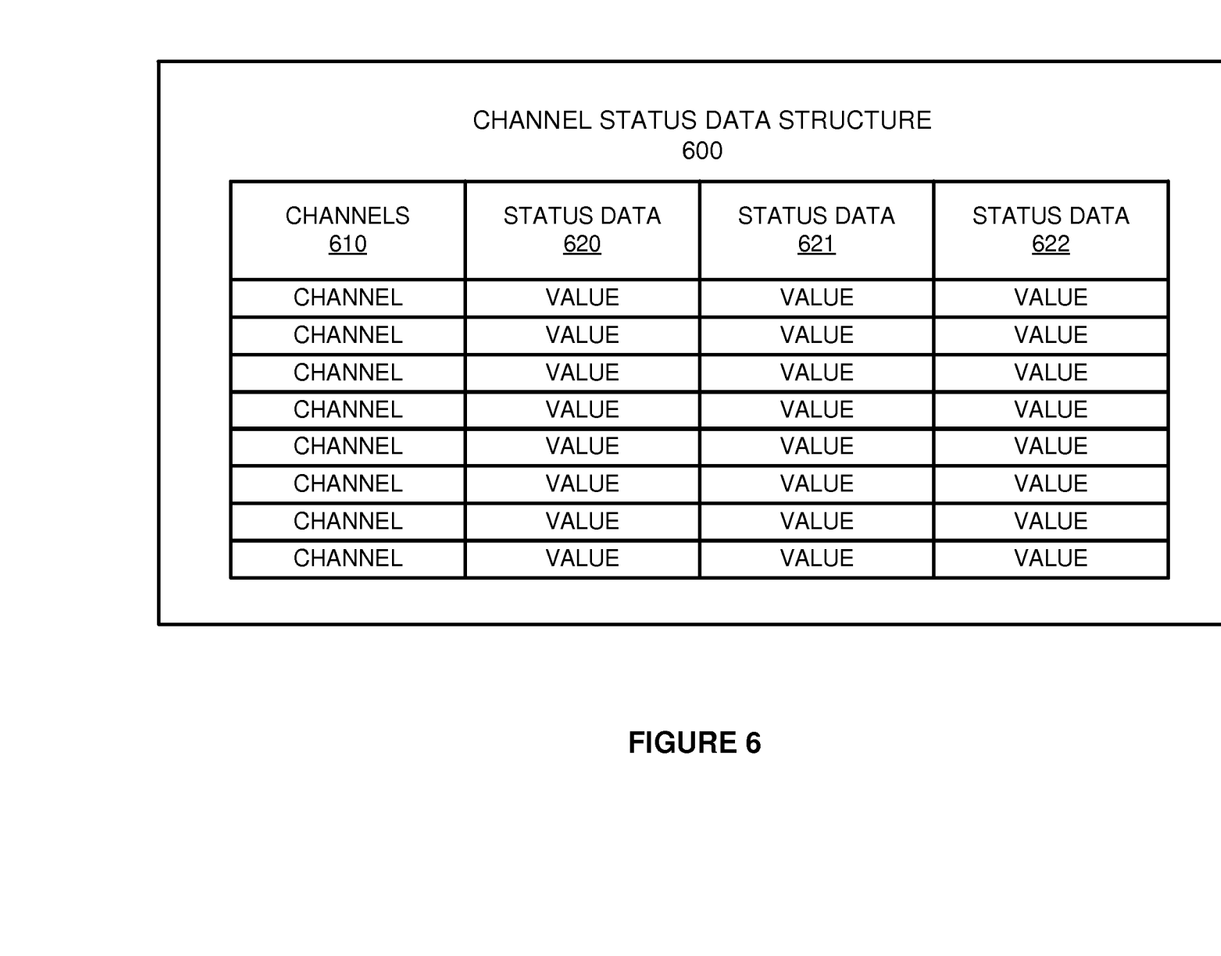
FIG. 6 illustrates a channel status data structure to manage channel status information from one or more wireless communication devices.

FIG. 6 illustrates a channel status data structure 600 to manage channel status information from one or more wireless communication devices. Channel status data structure 600 includes channels 610 and status data 620-622. Status data 620-622 may comprise various channel status information obtained from wireless communication devices that communicate over a wireless communication device. Status data 620-622 may comprise indications of whether a communication could be completed over the channels, signal to noise information about the channels, capacity information about the channels, location information for devices using the channels, or any other similar channel status information, including combinations thereof.

As described herein, a MME may receive channel status information for a plurality of channels in a CDMA or some other third generation wireless network. In particular, wireless devices may transmit, over a LTE network, a communication request for an application or process on the device. In response to the request, the MME may redirect the communication to the CDMA or other third generation network based on the type of process requesting the communication. For example, all voice communication initiated over LTE may be directed to the third generation network. Once the communications are ended, either by the communication being completed or failed on the third generation network, and the devices are reattached to the LTE network, the devices may report back the status information for the channels used on the third generation network.

As the information is received from the devices, the MME may manage the data in one or more data structures to identify future channels for communication requests. In the present example, the data is placed in a table consisting of categories channels 610 and status data 620-622, however, it should be understood that the data may be stored in a linked list, array, tree, or some other data structure. Once the data is stored and a communication request is received, the MME may use the information in channel status data structure 600 to identify a channel.

In some implementations, criteria may be defined for channels to be provided to requesting WCD. For example, when a request is received, the MME may compare the values provided in status data 620-622 to the criteria to identify channels that meet the required criteria. When a channel is identified, the channel may be supplied to the requesting wireless device. In some examples, scores may be generated from the status data for each of the channels, which can be compared to a criteria value to determine whether the channel should be supplied to a connecting device.

Figure 7:
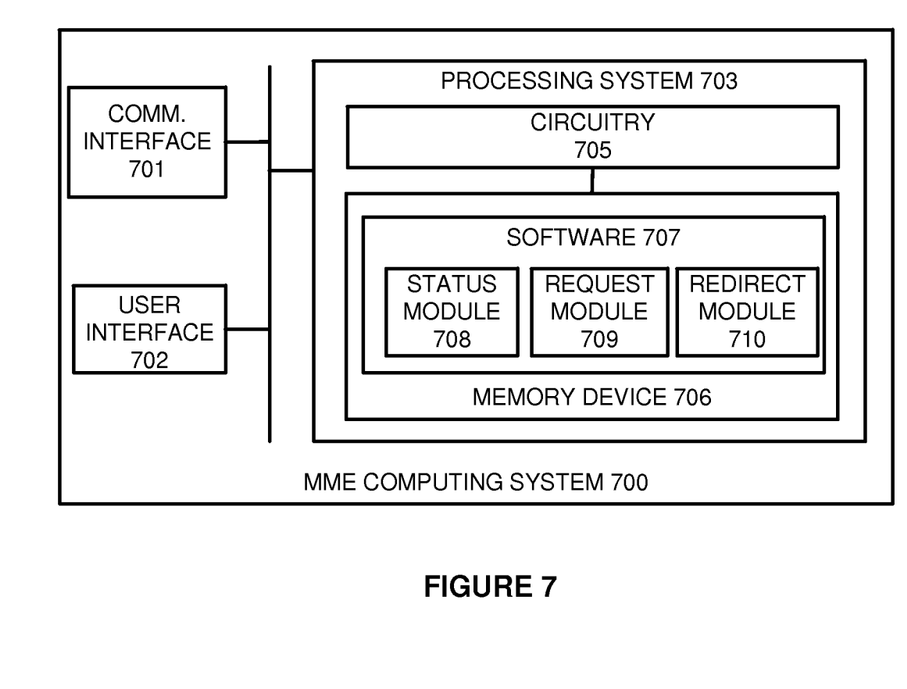
FIG. 7 illustrates a mobility management entity computing system to redirect communication requests from wireless communication devices based on channel status information.

FIG. 7 illustrates a MME computing system 700 to redirect communication requests from wireless communication devices based on channel status information. MME computing system 700 is representative of any computing system or systems with which the various operational architectures, processes, scenarios, and sequences disclosed herein for a MME may be implemented. MME computing system 700 is an example of MME 132 and MME 432, although other examples may exist. MME computing system 700 comprises communication interface 701, user interface 702, and processing system 703. Processing system 703 is linked to communication interface 701 and user interface 702. Processing system 703 includes processing circuitry 705 and memory device 706 that stores operating software 707. MME computing system 700 may include other well-known components such as a battery and enclosure that are not shown for clarity.

Communication interface 701 comprises components that communicate over communication links, such as network cards, ports, radio frequency (RF) transceivers, processing circuitry and software, or some other communication devices. Communication interface 701 may be configured to communicate over metallic, wireless, or optical links. Communication interface 701 may be configured to use Time Division Multiplex (TDM), Internet Protocol (IP), Ethernet, optical networking, wireless protocols, communication signaling, or some other communication format—including combinations thereof. In particular, communication interface 701 may communicate with gateways, such as serving gateways or other similar gateways, in a wireless provider network to configure and manage communications over the wireless provider network.

User interface 702 comprises components that interact with a user to receive user inputs and to present media and/or information. User interface 702 may include a speaker, microphone, buttons, lights, display screen, touch screen, touch pad, scroll wheel, communication port, or some other user input/output apparatus—including combinations thereof. User interface 702 may be omitted in some examples.

Processing circuitry 705 comprises microprocessor and other circuitry that retrieves and executes operating software 707 from memory device 706. Memory device 706 comprises a non-transitory storage medium, such as a disk drive, flash drive, data storage circuitry, or some other memory apparatus. Processing circuitry 705 is typically mounted on a circuit board that may also hold memory device 706 and portions of communication interface 701 and user interface 702. Operating software 707 comprises computer programs, firmware, or some other form of machine-readable processing instructions. Operating software 707 includes status module 708, request module 709, and redirect module 710, although any number of software modules may provide the same operation. Operating software 707 may further include an operating system, utilities, drivers, network interfaces, applications, or some other type of software. When executed by processing circuitry 705, operating software 707 directs processing system 703 to operate MME computing system 700 as described herein.

In particular, wireless communication devices may generate communication requests over a LTE network that are received by MME computing system 700. Based on the type of request received, the communications may be redirected to channels in an alternative network, such as a CDMA or some other wireless network. Once the communications are successfully completed, or failed in some examples, the wireless devices that were redirected to the alternative network may report channel status information over the LTE network for the alternative network.

As the channel status information is transmitted, status module 708 directs processing system 703 to receive the channel status information. Once channel status information is obtained, request module 709 directs processing system 703 to receive a communication request from a wireless communication device over the LTE network, wherein the communication request is to be redirected to the alternative wireless network. In response to receiving the request, redirect module 710 identifies a channel within the alternative network to service the communication request based on the channel status information. In some implementations, the channel status information may be compared with criteria to determine a channel capable of supporting the new communication request. For example, criteria may be defined for a percentage of communications that have been successful on a particular channel, for signal to noise on a particular channel, capacity on a particular channel, or any other similar criteria for a channel in the alternative network.

Once a channel is determined for the communication request, redirect module 710 directs processing system 703 to transfer a notification to the wireless communication device indicating the channel for the communication. The wireless device may then use the channel for the desired communication.

In some implementations in addition to or in place of receiving channel status information from other devices, the requesting wireless communication device may provide the channel status information. For example, the requesting wireless device may transfer a first communication request to MME computing system 700 and receive a first channel for the communication from MME computing system 700. This channel may be selected at random, based on a balancing distribution algorithm, or by some other means that is not influenced by status information of the channels. Once the communication fails on the first channel, the wireless device may transfer a second communication request, wherein the second communication request provides status information for the channel used in the first communication. Based on the information provided in the request, MME computing system 700 may identify an alternative channel for the communication, and provide the alternative channel to the requesting device.

Returning to the elements of FIG. 1, WCD 110 may comprise Radio Frequency (RF) communication circuitry and an antenna. The RF communication circuitry typically includes an amplifier, filter, modulator, and signal processing circuitry. WCD 110 may include include a user interface, memory device, software, processing circuitry, or some other communication components. WCD 110 may comprise a telephone, computer, e-book, mobile Internet appliance, wireless network interface card, media player, game console, or some other wireless communication apparatus.

LTE access system 120 and alternative access system 122 each comprises RF communication circuitry and at least one antenna to provide wireless communication services to WCD 110. The RF communication circuitry typically includes an amplifier, filter, RF modulator, and signal processing circuitry. LTE access system 120 and alternative access system 122 may each comprise switches, wireless access nodes, Internet routers, network gateways, servers, computer systems, communication links, or some other type of communication equipment—including combinations thereof.

Network gateways 130 and MME 132 may each comprise one or more computing systems capable of routing and managing communications across LTE access system 120 and alternative access system 122. Network gateways 130 and MME 132 may each include processing systems, storage systems, communication interfaces, user interfaces, and other similar computing systems. Network gateways 130 may comprise one or more serving gateways, one or more packet data network gateways, or any other similar gateways.

Network 135 may comprise the Internet, IMS, or some other network that provides services to WCD 110. Network 135 may comprise switches, wireless access nodes, Internet routers, network gateways, application servers, computer systems, communication links, or some other type of communication equipment—including combinations thereof.

Wireless signaling 145 uses wireless links that use the air or space as transport media for CDMA or some other third generation wireless protocol. Wireless signaling 146 uses wireless links that use the air or space as transport media for LTE communication format. Communication links 140-143 could use various communication protocols, such as Time Division Multiplex (TDM), Internet Protocol (IP), Ethernet, communication signaling, wireless communication signaling, or some other communication format—including combinations thereof. Communication links 140-143 could be a direct link or may include intermediate networks, systems, or devices.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a mobility management entity to redirect a communication request from a wireless communication device based on channel status information, the method comprising:
   receiving, over a Long Term Evolution (LTE) network, the channel status information for one or more channels in an alternative wireless network from one or more wireless communication devices, wherein the channel status information indicates whether the one or more channels completed communications for the one or more wireless communication devices;
   receiving the communication request over the LTE network from the wireless communication device;

in response to the communication request, identifying a channel in the alternative wireless network to support the communication request based on the channel status information; and transferring a notification to the wireless communication device to indicate the identified channel.

2. The method of claim 1 wherein the alternative wireless network comprises a code division multiple access (CDMA) wireless network.

3. The method of claim 1 further comprising:

receiving, prior to the communication request, a preliminary communication request over the LTE network from the wireless communication device; and in response to the preliminary communication request, transferring a preliminary notification to the wireless communication device to indicate a preliminary channel in the alternative wireless network to support the preliminary communication request;

wherein receiving the channel status information for the one or more channels in the alternative wireless network from the one or more wireless communication devices comprises receiving the channel status information for the preliminary channel in the alternative wireless network from the wireless communication device, wherein the channel status information is provided with the communication request.

4. The method of claim 3 wherein the channel in the alternative wireless network comprises a different channel than the preliminary channel in the alternative wireless network.

5. The method of claim 1 wherein the communication request comprises a voice call communication request.

6. The method of claim 1 wherein the communication request comprises a video communication request.

7. The method of claim 1 wherein the channel status information for the one or more channels in the alternative wireless network further comprises signal to noise information for the one or more channels in the alternative wireless network, capacity information for the one or more channels in the alternative wireless network, and location information for the one or more wireless communication devices.

8. An apparatus to redirect a communication request from a wireless communication device based on channel status information, the apparatus comprising:

at least one non-transitory computer readable media;

processing instructions stored on the at least one non-transitory computer readable media that, when executed by a processing system, direct the processing system to:

receive, over a Long Term Evolution (LTE) network, the channel status information for one or more channels in an alternative wireless network from one or more wireless communication devices, wherein the channel status information indicates whether the one or more channels completed communications for the one or more wireless communication devices;

receive the communication request over the LTE network from the wireless communication device;

in response to the communication request, identify a channel in the alternative wireless network to support the communication request based on the channel status information; and transfer a notification to the wireless communication device to indicate the identified channel.

9. The apparatus of claim 8 wherein the alternative wireless network comprises a code division multiple access (CDMA) wireless network.

10. The apparatus of claim 8 wherein the processing instructions further direct the processing system to:

receive, prior to the communication request, a preliminary communication request over the LTE network from the wireless communication device; and in response to the preliminary communication request, transfer a preliminary notification to the wireless communication device to indicate a preliminary channel in the alternative wireless network to support the preliminary communication request; and wherein the processing instructions to receive the channel status information for the one or more channels in the alternative wireless network from the one or more wireless communication devices direct the processing system to receive the channel status information for the preliminary channel in the alternative wireless network from the wireless communication device, wherein the channel status information is provided with the communication request.

11. The apparatus of claim 10 wherein the channel in the alternative wireless network comprises a different channel than the preliminary channel in the alternative wireless network.

12. The apparatus of claim 8 wherein the communication request comprises a voice call communication request.

13. The apparatus of claim 8 wherein the communication request comprises a video communication request.

14. The apparatus of claim 8 wherein the channel status information for the one or more channels in the alternative wireless network further comprises signal to noise information for the one or more channels in the alternative wireless network, capacity information for the one or more channels in the alternative wireless network, and location information for the one or more wireless communication devices.

15. The apparatus of claim 8 wherein the processing instructions to identify the channel in the alternative wireless network to support the communication request based on the channel status information direct the processing system to identify the channel in the one or more channels that meets service criteria based on the channel status information.

16. A method of operating a mobility management entity (MME) to redirect a communication request:

receiving a first request over a Long Term Evolution (LTE) network for a first communication on a wireless communication device;

in response to the request, transferring a notification to the wireless communication device that indicates a first channel in an alternative wireless network for the first communication;

receiving a second request over the Long Term Evolution (LTE) network for a second communication on the wireless communication device, wherein the second request indicates channel status information indicating whether the first channel completed the first communication for the wireless communication device;

in response to the second request, identifying a second channel in the alternative wireless network for the second communication based on the channel status information; and transferring a second notification to the wireless communication device that indicates the second channel in the alternative wireless network for the second communication.

17. The method of claim 16 wherein the alternative wireless network comprises a code division multiple access (CDMA) wireless network.

18. The method of claim 16 wherein the communication request comprises a voice call communication request.

\* \* \* \* \*